United States Patent [19]

Burns et al.

[11] 3,749,829

[45] July 31, 1973

[54] SLOW SCAN PROCEDURE FOR HIGH RESOLUTION GRAPHICS MODE VIDEO SCENE COMPATIBLE WITH CONDITIONAL REPLENISHMENT TYPE OF BANDWIDTH REDUCTION

[75] Inventors: Harry Shaner Burns, Oceanport; Richard Carrel Miller, Summit; Helmuth Otto Sautter, Middletown, all of N.J.

[73] Assignee: Bell Telephone Laboratories, Incorporated, Murray Hill, Berkeley Heights, N.J.

[22] Filed: May 14, 1971

[21] Appl. No.: 143,520

[52] U.S. Cl. .......... 178/6.8, 178/DIG. 3

[51] Int. Cl. .......... H04n 7/12

[58] Field of Search .......... 178/6.8, 7.2, DIG. 3

[56] References Cited

UNITED STATES PATENTS

| | | | |
|---|---|---|---|
| 3,470,313 | 9/1969 | Bockwoldt | 178/DIG. 3 |
| 3,571,505 | 3/1971 | Mounts | 178/7.2 |
| 2,921,211 | 1/1960 | Toulon et al. | 178/DIG. 3 |
| 3,475,555 | 10/1969 | McMann, Jr. | 178/6.8 |
| 3,663,749 | 5/1972 | Cannon | 178/DIG. 3 |

*Primary Examiner*—Robert L. Griffin
*Assistant Examiner*—Joseph A. Orsino, Jr.
*Attorney*—Edwin B. Cave and W. L. Keefauver

[57] ABSTRACT

A slow scan, high resolution video signal is rendered compatible with a video bandwidth reduction technique known as conditional replenishment by a unique scan in which a single master frame is compiled by scanning of successive subframes. Each successive subframe consists of a small number of master frame lines which are spatially separated from each other in the master frame by a uniform distance, and which are adjacent to the lines of the preceding subframe.

4 Claims, 8 Drawing Figures

INVENTORS H. S. BURNS
R. C. MILLER
H. O. SAUTTER

BY Charles E. Graves

ATTORNEY

ILLUSTRATIVE TYPICAL GRAPHICS MODE SUBJECT

SLOW SCAN PROCEDURE FOR HIGH RESOLUTION GRAPHICS MODE VIDEO SCENE COMPATIBLE WITH CONDITIONAL REPLENISHMENT TYPE OF BANDWIDTH REDUCTION

FIELD OF THE INVENTION

This invention is in the field of bandwidth reduction; and specifically relates to rendering a general signal compatible with a video bandwidth reduction technique known as conditional replenishment.

BACKGROUND OF THE INVENTION

In the patent application of C. C. Cutler and F. W. Mounts, Ser. No. 786,244, filed Dec. 28, 1968, now U.S. Pat. No. 3,584,145 issued June 8, 1971, assigned to applicant' assignee, and which is hereby incorporated by reference, there is described a video signal redundancy reduction technique which takes advantage of frame-to-frame correlation. In this technique, only those picture elements that change significantly between successive frames are transmitted. By not transmitting elements that have undergone little or no frame-to-frame change, a standard bandwidth video channel may be used for three video links, for example.

In the Cutler-Mounts scheme, a reference picture is stored at the transmit end of a channel. Those picture elements that change in amplitude sufficiently with each successive frame are in the reference picture updated or replenished. An identical reference picture is maintained at the receive end, and only the updating information is transmitted.

The receiver reference picture is supplied with the new value and position of the elements to be replenished. For most scenes this information is generated at a random rate since the causative movement is random. Hence, in order to feed the information to the transmission channel at a uniform bit rate, buffers are used in combination with a variable replenishment threshold.

Pursuant to this aspect of the Cutler-Mounts invention, the threshold which determines whether or not a significant change in a picture element has occurred, is varied as a function of the amount of information currently in the buffer. In this way, the average buffer replenishment rate is at all times matched to the bit-rate capacity of the channel.

One property of this threshold control function is that, as the subject before the television camera becomes more active, an increased number of samples will be stored in the buffer. To avoid overloading the buffer in such instances, the threshold level is increased to permit replenishment of only the more extensive frame-to-frame amplitude changes between corresponding picture elements. Conversely, as the subject becomes less active, fewer elements are stored in the buffer. In this case the threshold level is decreased permitting updating of the reference frame in accordance with substantially all changes occurring. The extreme of this case is a completely still subject, such as a document or a photograph.

From the preceding, it is seen that, first, some minimum amount of data must be kept in the buffer at all times so that data is always available for transmission. Secondly, if drastic movement causes the buffer to become momentarily overloaded—that is, its information input rate exceeds the assigned transmission channel capacity—then all replenishment is momentarily stopped even though frame-to-frame differences continue to occur.

The Cutler-Mounts redundancy reduction technique permits sizable reductions in the transmission bit rate of a visual communication system. However, since the technique is designed to process the typical video scenes in which a high frame-to-frame correlation exists, the technique is not able to process material in which lower frame-to-frame correlations occur.

An illustration of the latter is a system for sending still graphics material in fine highly resolved detail. In one such system currently contemplated for videotelephony, a slow-scanning camera generates a single frame consisting of 2,048 sequential lines having altogether $3 \times 10^6$ elements. Since this is many more lines and elements then are contained in the present video telephone frame, a conventional line-sequential scan of the graphics material would produce a signal that is not compatible with the Cutler-Mounts technique.

One reason for the incompatibility is that a high statistical likelihood exists that the buffer will overload and stall the transmissions. Consider for example, a graphics scene comprising a printed page. It can be appreciated intuitively that a standard line sequential scanner will generate signals that are not correlated at video telephone rates since this would typically be a comparison of a first sequential set of 16 slow-scan lines with a succeeding set. The probable lack of correlation between the two sets will likely overwhelm the buffer; and at least some of the information will be lost.

A further complication is that, whereas the Cutler-Mounts scheme looks for frame-to-frame comparisons at some prescribed framing rate such as one-thirtieth second, the single slow-scan frame requires about 4 seconds to generate.

The problem, therefore, is to find a high resolution-scanning technique that will ensure the required frame-to-frame correlation compatible with the Cutler-Mounts redundancy-reduction technique, and yet will result in the desired high resolution picture at the receiving end; and the foregoing is the principal inventive object.

SUMMARY OF THE INVENTION

Pursuant to the invention, a modified scanning procedure is used to simulate the high frame-to-frame correlation, by dividing a single slow-scan "master" frame comprising for example, 2,048 lines, into a large number of subframes which are created at whatever framing rate is employed in the video system. Each subframe consists of a small number of lines which are spatially separated from each other in the master frame by a uniform distance. Thus, the first subframe consists of every nth line in the master frame, where $n$ might for example be 128. The second subframe then consists of every $n + 1$th line in the master frame.

The successive frames in the above scheme—as applied to most stationary graphics material such as a printed page, line drawing, or photograph—tend to be highly correlated to one another. Therefore, to the conditional replenishment coder, the successive frames "look alike." This may be appreciated by recognizing that for subjects which are highly resolved—i.e., in which the number of resolution elements per unit area is large compared to the number of black-white transitions per unit area—adjacent scanned lines will tend to differ little, element for element.

The invention and its further objects, features and advantages will be readily appreciated by reading the description to follow of an illustrative embodiment thereof.

DETAILED DESCRIPTION OF AN ILLUSTRATIVE EMBODIMENT

Figure 1:
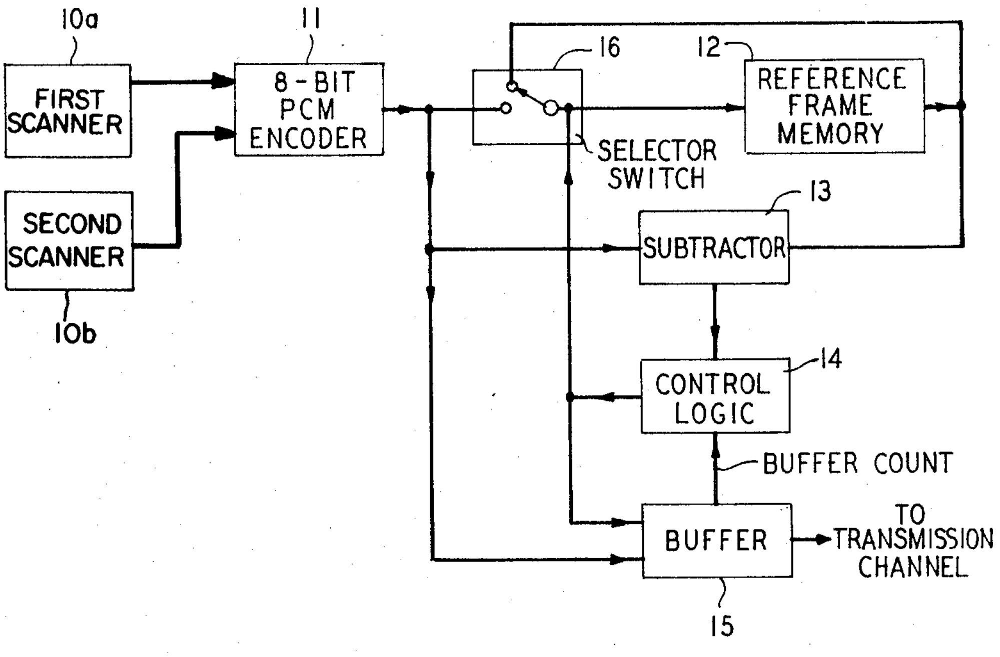
FIG. 1 is a schematic block diagram of a prior art redundancy-reduction technique for video signal transmission.

A conditional replenishment system pursuant to the Cutler-Mounts invention is depicted in FIG. 1. The system consists of a video camera depicted by first scanner 10a dnd PCM (pulse code modulation) encoder 11 which samples the signals from first scanner 10a and encodes them into eight-bit PCM signals. The signals are then compared with a reference picture stored in reference frame memory 12, which holds one complete frame of video information. In memory 12, 250 picture elements per line and 271 lines scanned per frame by the first scanner 10a are sample encoded as an eight-bit PCM signal.

The comparison is made by subtracter 13 which indicates the absolute difference between the new sample of information and the reference value corresponding to the same picture element. A control logic unit 14 receives each sample difference signal and, depending upon its magnitude and the fullness of a buffer store 15 decides whether or not the difference is "significant." If it is, the new signal value is switched through switch 16 into reference frame memory 12. Otherwise, switch 16 recirculates the information already stored in memory 12.

The new signal value, accompanied by its address position along its scan line, is forwarded by unit 14 to buffer store 15 which has a capacity of about 600,000 bits. Buffer 15 matches the varying data rate to the constant bit rate of the transmission channel.

Figure 2:
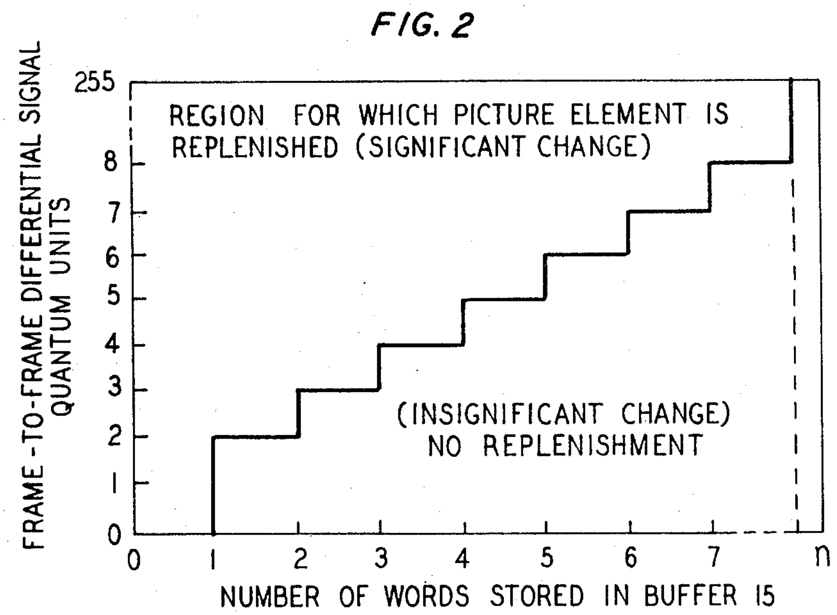
FIG. 2 is a graph depicting the "threshold" function for the system of FIG. 1.

The average reference frame replenishment rate is made to match the capacity of the transmission channel by varying the "significant" change threshold as a function of the amount of information stored in buffer 15. This is achieved within control logic unit 14 by the operating characteristic depicted in the graph of FIG. 2. The absolute value of the frame-to-frame difference signal derived by subtracter 13 is expressed along the ordinate as 255 discrete levels. The number of replenished elements stored in the buffer is expressed along the abscissa up to the capacity of buffer 15. The area above the staircase curve represents the "significant" change region, for which control logic unit 14 calls for replenishment of picture information. The area below the staircase curve represents an insignificant change in picture information, for which the unit 14 causes the information stored in frame memory 12 to be retained, that is, not updated.

Only the significant changes in picture information are transmitted. The receiver terminal (not shown) includes a reference frame memory that is updated identically to memory 12, and other equipment to decode and present the signal. Reference is again made to the patent application of Cutler-Mounts Ser. No. 786,244 for a complete description of the receiver terminal and the system in general.

Figure 3:
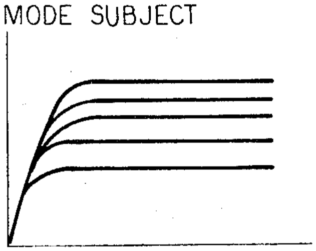
FIG. 3 is a typical graphics mode subject to be transmitted by a video telephone channel.
Figure 4:
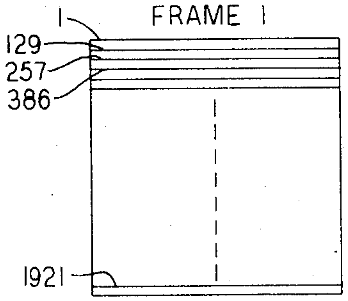
FIGS. 4–8 are schematic diagrams of the lines scanned in each of several successive frames, to transmit the subject of FIG. 3 pursuant to the present invention.
Figure 5:
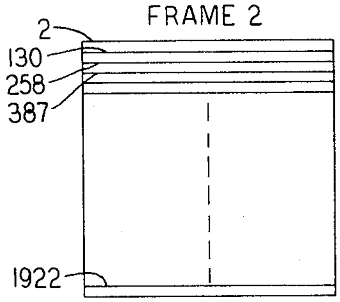
Figure 6:
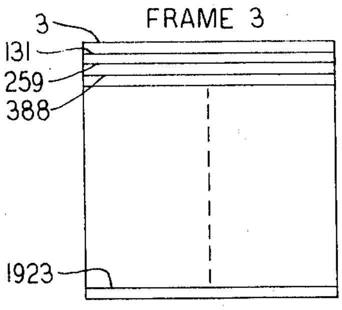
Figure 7:
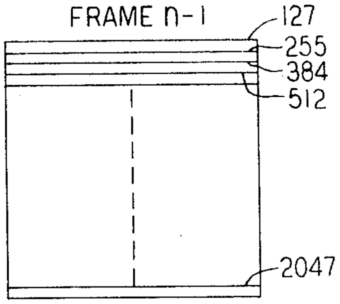
Figure 8:
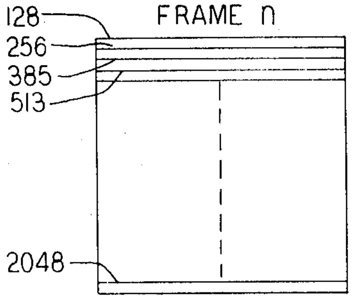

Practice of the present invention with the abovedescribed conditional replenishment coder is illustrated with the aid of FIGS. 3–8. A still subject, such as the graph of FIG. 3, is to be slow-scanned through a single "master" frame by second scanner 10*b* and transmitted through the coder of FIG. 1.

The slow-scan picture consists of, for example, 2,048 lines. These lines are temporally subdivided into subsets, the members of each subset being spatially adjacent to the corresponding members of the preceding subset. Each subset makes up a subframe; and the subframes are successively scanned by second scanner 10*b*. The framing rate for the subframes in the designed rate for the video system, which in the case of standard video telephony in the United States, is one-thirtieth second.

The first subframe consists of line 1 of the master frame, and every nth line thereafter. Thus, as pictured in FIG. 4, the first subframe consists of lines 1, 129, 257, 385, 513, . . . 1920 of the master frame. The next-scanned, or second, subframe consists of line 2 of the master frame and every nth line thereafter; or lines 2, 130, 258, 386, 514, . . . 1921. The third subframe is similarly composed, and so on as depicted in FIGS. 4–8 until with the scanning of the nth subframe, all lines of the master frame have been scanned.

The slow-scan signal generated in this manner will tend to have excellent correlation between each successive subframe, since the respective lines of temporally adjacent subframes are each themselves spatially adjacent in the master frame. An exception can occur if the subject contains a large number of rulings oriented along the direction of scan and equispaced with a period of **2048/*n*** scanning lines or a submultiple thereof: in this case the buffer store will be overwhelmed at least twice during the slow scan of the subject. This, however, is an exceptional circumstance and one which can always be avoided by orienting the direction of the scanning lines to make an appreciable angle with the rulings in the subject matter. Therefore it is generally true that, in the above slow-scan scheme, successive line sets (subframes) can be made to consist of successively adjacent lines which are highly correlated from subframe to subframe.

The resulting signal is compatible with conditional replenishment coders as well as with direct line connections. Further, the slow-scan signals can be transmitted through the conditional replenishment coder facilities at the same rate as for direct line—or in other words, in about 4 seconds.

Other combinations of subframes are possible beside the illustrated subdivision consisting of 128 subframes each with 16 lines. For example, a subdivision consisting of 256 subframes each with eight lines may be advantageous because this subframe rate equals the standard video telephone field rate of one-sixtieth second.

In general one selects the number of subframes by adjusting the slow-scan line rate to yield an integral number of lines in one video telephone frame. The total number of slow-scan lines is then adjusted to yield an integral number of subframes, but, at the same time, is maintained large enough to provide the desired high spatial resolution. Satisfying these relations, number of subframes = total number of slow-scan lines $x$ line time/video telephone frame rate It is to be understood that the embodiments described herein are merely illustrative of the principles of the invention. Various modifications may be made thereto by persons skilled in the art without departing from the spirit and scope of the invention.

What is claimed is:

1. In combination:

a first scanner having a first frame time and a first number of lines per frame, for effecting line-sequential scan of a subject;

means for sampling the video signals from said first scanner and for digitally encoding each said sample;

frame memory means for receiving said encoded signal samples and for storing a complete frame of said samples as a reference frame;

buffer means connectable between said frame memory means and a transmission channel, for storing and feeding video signal samples to said channel at a rate equal to the channel capacity;

said transmission channel capacity being substantially less than the rate at which said first scanner generates picture information of said subject;

means for determining the magnitude of the difference between samples of said reference frame and the corresponding new samples of said video signal;

means for monitoring the number of signal samples currently stored in said buffer;

control logic means, reponsivie to the value of said difference and also to the number of samples presently in said buffer, for establishing a threshold for determining whether each said difference is significant enough to transmit in said channel, said threshold having multitudinous discrete levels that are increasingly higher as a function of said buffer fill;

means for feeding said significantly different signal samples to said buffer and for stopping the buffer feed whenever said buffer is full, regardless of the extent of said difference between said corresponding samples; and a second scanner connected to said sampling means and comprising means for scanning a subject using a master frame with substantially more scan lines than the frame scanned by said first scanner, means for sequentially scanning successive subsets of lines within said master frame, each said subset comprising lines that with respect to the totality of lines of said master frame are separated from each other by a large and substantially constant number of intervening lines, the members of each said subset further being spatially adjacent in said master frame to the corresponding members of the preceding subset, and each said subset having substantially the same framing time as that of said first scanner.

2. The combination of claim 1, wherein said master frame consists of 2,048 lines and each said subset consists of 128 lines.

3. The combination of claim 1, wherein said master frame consists of 2,048 lines and each said subset consists of 256 lines.

4. The combination of claim 1, characterized in that said buffer means is connected to said transmission channel for transmission of said buffer contents at a uniform rate to a receiver.

* * * * *